United States Patent
Subhaschandra et al.

(10) Patent No.: US 11,405,312 B2
(45) Date of Patent: Aug. 2, 2022

(54) DIRECTED ACYCLIC GRAPH TEMPLATE FOR DATA PIPELINE

(71) Applicant: Megh Computing, Inc., Hillsboro, OR (US)

(72) Inventors: Suchit Subhaschandra, Portland, OR (US); Jonathan Beare, Hillsboro, OR (US); Duncan Moss, Hillsboro, OR (US)

(73) Assignee: MEGH COMPUTING, INC., Hillsboro, OR (US)

( * ) Notice: Subject to any disclaimer, the term of this patent is extended or adjusted under 35 U.S.C. 154(b) by 46 days.

(21) Appl. No.: 17/014,918

(22) Filed: Sep. 8, 2020

(65) Prior Publication Data

US 2022/0078107 A1    Mar. 10, 2022

(51) Int. Cl.
  *H04L 45/48* (2022.01)
  *H04L 45/02* (2022.01)
  *G06F 16/901* (2019.01)
  *H04L 69/22* (2022.01)
  *H04L 45/00* (2022.01)

(52) U.S. Cl.
  CPC .......... *H04L 45/48* (2013.01); *G06F 16/9024* (2019.01); *H04L 45/02* (2013.01); *H04L 45/54* (2013.01); *H04L 69/22* (2013.01)

(58) Field of Classification Search
  None
  See application file for complete search history.

(56) References Cited

U.S. PATENT DOCUMENTS

| | | | | |
|---|---|---|---|---|
| 2018/0349108 | A1* | 12/2018 | Brebner | G06F 8/311 |
| 2019/0146830 | A1* | 5/2019 | Gerber | G06N 20/00 |
| | | | | 718/101 |
| 2019/0392002 | A1* | 12/2019 | Lavasani | G06F 8/41 |

OTHER PUBLICATIONS

"Project Catapult," Microsoft Website, Available as early as Sep. 28, 2016, https://www.microsoft.com/en-us/research/project/project-catapult/, 8 pages.

Caulfield, A. et al., "A Cloud-Scale Acceleration Architecture," The 49th Annual IEEE/ACM International Symposium on Microarchitecture, Oct. 2016, 13 pages.

(Continued)

*Primary Examiner* — Xavier S Wong
(74) *Attorney, Agent, or Firm* — Alleman Hall Creasman & Tuttle LLP

(57) ABSTRACT

A computing system is provided, including a processor configured to receive a directed acyclic graph (DAG) template specifying a data pipeline of a plurality of processing stages. For each processing stage, the processor may be further configured to select a respective processing device of a plurality of communicatively linked processing devices. The processor may be further configured to determine a routing sequence between the plurality of processing devices according to the DAG template. The processor may be further configured to transmit a plurality of input packets encoding the plurality of processing stages to the respective processing devices selected for the processing stages as specified by the routing sequence. In response to transmitting the plurality of input packets, the processor may be further configured to receive, from a processing device of the plurality of processing devices, one or more output packets encoding a processing result of the data pipeline.

14 Claims, 11 Drawing Sheets

(56) References Cited

OTHER PUBLICATIONS

"DeepStream SDK," NVIDIA Developer Website, Available as early as Dec. 21, 2016, https://developer.nvidia.com/deepstream-sdk, 15 pages.

Delite, Stanford University, available online at https://stanford-ppl.github.io/Delite/, retrieved on Jun. 2, 2020.

Spiral Software/Hardware Generation for Performance, available online at https://www.spiral.net/, retrieved on Jun. 2, 2020.

* cited by examiner

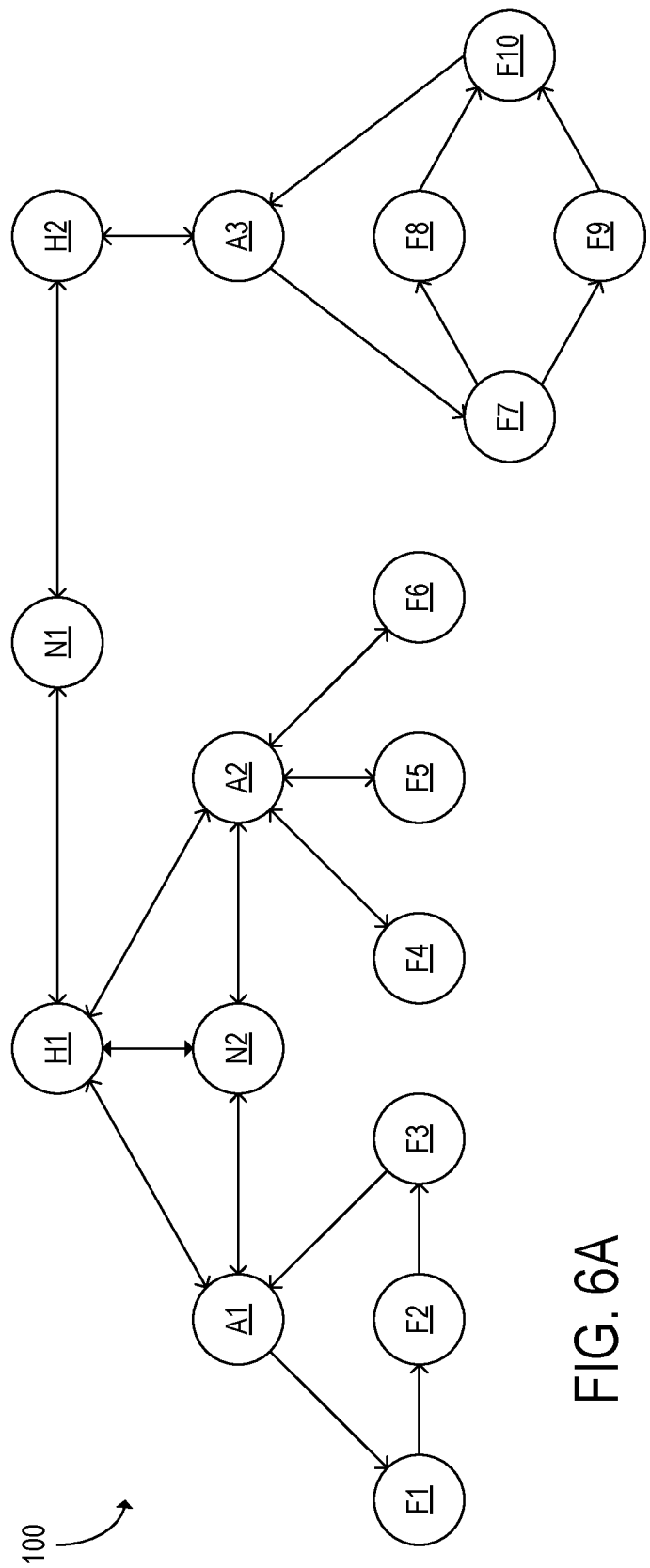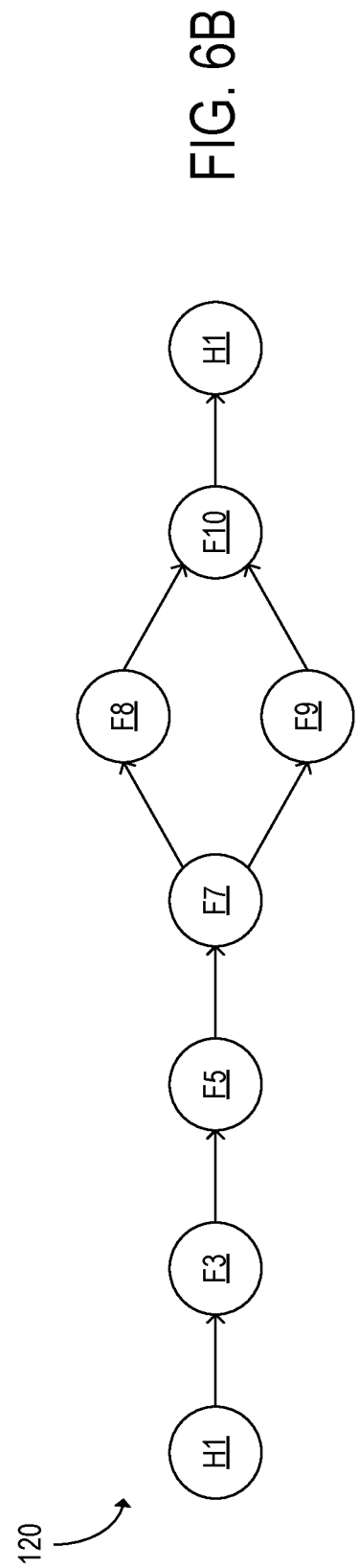

DIRECTED ACYCLIC GRAPH TEMPLATE FOR DATA PIPELINE

BACKGROUND

Specialized processing devices are increasingly used in a variety of different data processing applications, such as machine learning, video analysis, and computer graphics. These specialized processing devices may be designed to perform specific computational tasks more efficiently than those tasks would typically be performed on a general-purpose processor. Specialized processing devices are frequently used in data centers, where they may be included in server computing devices. Client computing devices may communicate with the server computing devices to offload computations that the specialized processing devices are designed to perform efficiently.

SUMMARY

According to one aspect of the present disclosure, a computing system is provided, including a processor configured to receive a directed acyclic graph (DAG) template specifying a data pipeline of a plurality of processing stages. For each processing stage of the plurality of processing stages, the processor may be further configured to select a respective processing device of a plurality of communicatively linked processing devices. The processor may be further configured to determine a routing sequence between the plurality of processing devices according to the DAG template. The processor may be further configured to transmit a plurality of input packets encoding the plurality of processing stages to the respective processing devices selected for the processing stages as specified by the routing sequence. In response to transmitting the plurality of input packets, the processor may be further configured to receive, from a processing device of the plurality of processing devices, one or more output packets encoding a processing result of the data pipeline.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A shows an example network topology including a plurality of host devices, a plurality of networks, a plurality of accelerators, and a plurality of functions, according to the embodiment of FIG. 1.

FIG. 6B shows an example data pipeline, according to the embodiment of FIG. 1.

DETAILED DESCRIPTION

When developers write code that is written to be executed using specialized processing devices, those developers typically have to specify the route by which data is passed between different computing devices. The developer may have to specify the respective application program interfaces (API) of each specialized processing device, as well as APIs by which local and remote servers may communicate. The APIs for specialized processing devices are typically not standardized between processing device manufacturers. As a result, writing code that utilizes specialized processing devices may be difficult and time-consuming for the developer. In addition, large portions of the code may have to be rewritten if the code is modified to be run on different hardware.

Figure 1:
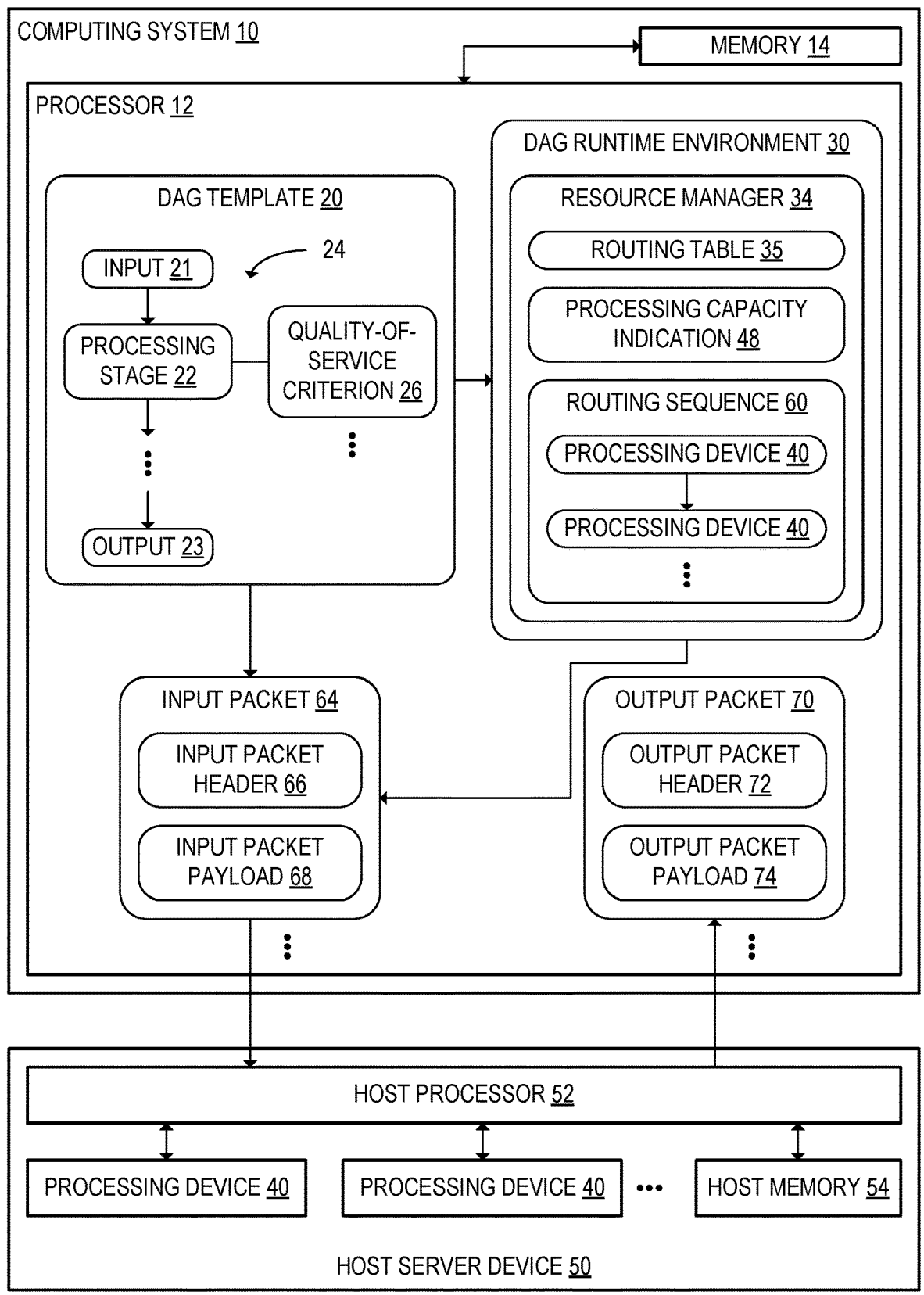
FIG. 1 shows an example computing system and an example host server device, according to one embodiment of the present disclosure.

In order to address the above shortcomings, a computing system 10 is provided, as shown in the example embodiment of FIG. 1. For example, the computing system 10 may be a local server device or a client device. As shown in FIG. 1, the computing system 10 includes a processor 12 and memory 14. In addition, FIG. 1 shows a host server device 50, which may be a local or remote server device. The host server device 50 shown in FIG. 1 includes a host processor 52 and host memory 54. The computing system 10 may be configured to communicate with the host server device 50 via a wired or wireless connection, which may be formed over a network. Thus, the processor 12 may be communicatively linked to the host processor 52 of the host server device 50. Although FIG. 1 shows two physical computing devices, other numbers of communicatively linked computing devices may be used instead.

Figure 2:
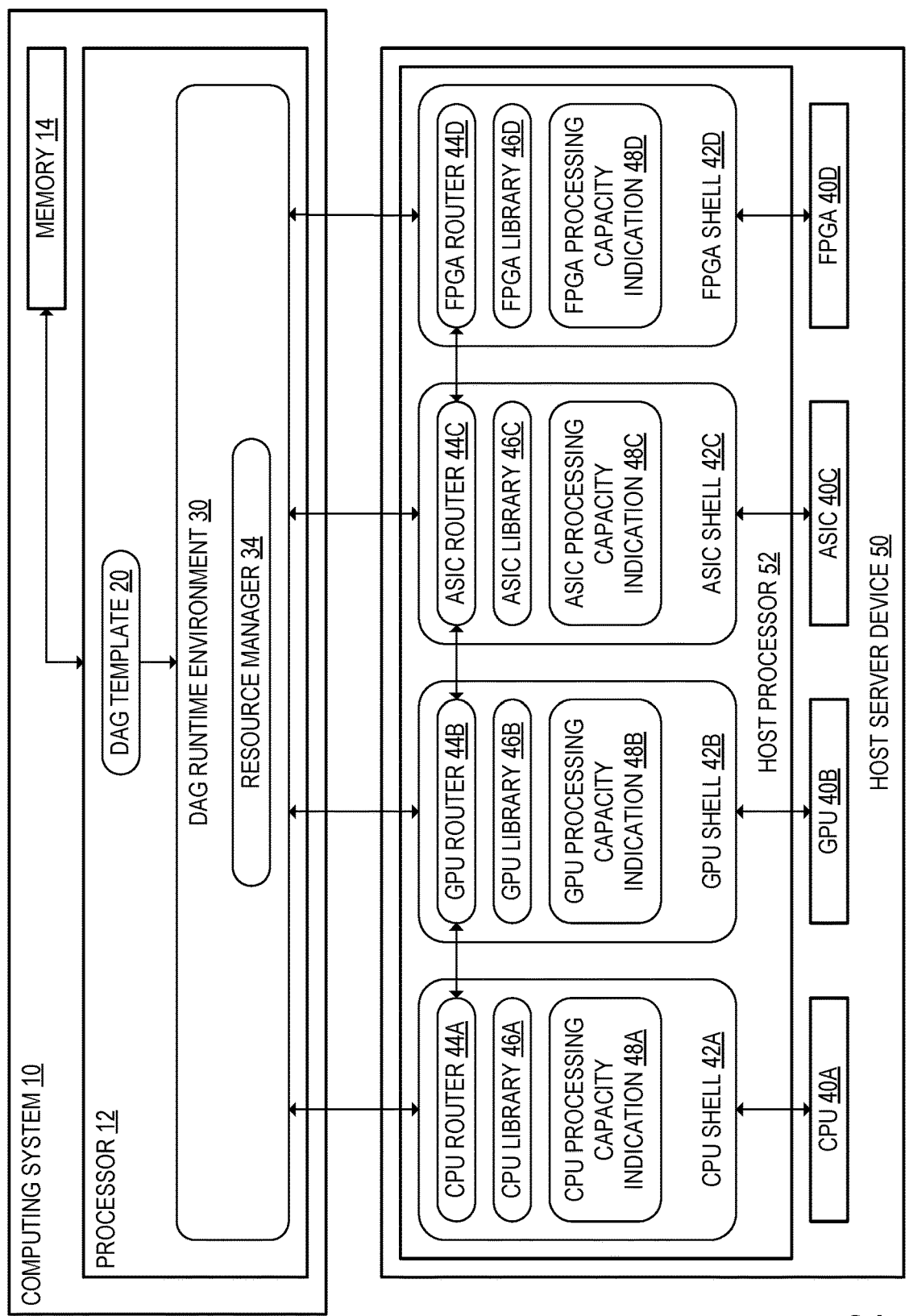
FIG. 2 shows the computing system and host server device when the host server device includes a plurality of processing devices, according to the embodiment of FIG. 1.

The host server device 50 shown in FIG. 1 further includes a plurality of processing devices 40. As depicted in the example of FIG. 2, each processing device 40 may be a central processing unit (CPU) 40A, a graphical processing unit (GPU) 40B, an application-specific integrated circuit (ASIC) 40C, or a field-programmable gate array (FPGA) 40D. Alternatively, other types of processing devices 40 may be included in the host server device 50. Although the plurality of processing devices 40 are depicted in FIGS. 1 and 2 as being included in a single host server device 50, the processing devices 40 may be distributed between a plurality of host server devices 50.

Returning to FIG. 1, the processor 12 of the computing system 10 may be configured to receive a directed acyclic graph (DAG) template 20 specifying a data pipeline 24 of a plurality of processing stages 22. Each processing stage 22 may include one or more code instructions configured to be executed on a processing device 40. The DAG template 20 may indicate a source device of an input 21 for the data pipeline 24. The DAG template 20 may further indicate a recipient device of an output 23 that results from processing the data pipeline 24. Thus, each of the processing stages 22 may be instructions to compute a function included in a larger function given by the data pipeline 24.

Figure 3:
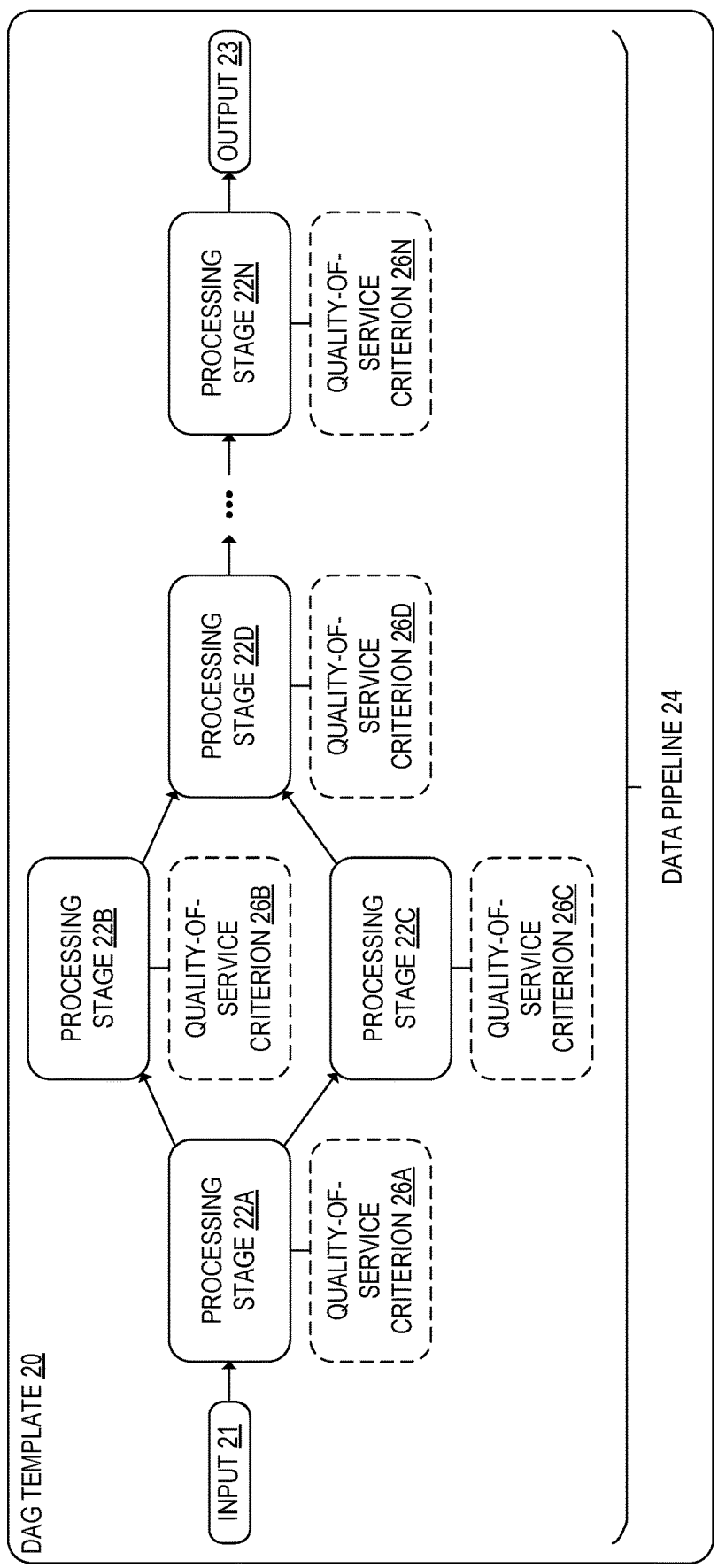
FIG. 3 shows an example directed acyclic graph (DAG) template, according to the embodiment of FIG. 1.

FIG. 3 shows an example DAG template 20 for a data pipeline 24 that includes an input 21, a plurality of processing stages 22A, 22B, 22C, 22D . . . 22N, and an output 23. As shown in the example of FIG. 3, the data pipeline 24 may include a plurality of branches that are configured to be computed in parallel. Although the example data pipeline 24 of FIG. 3 has one input 21 and one output 23, other data pipelines 24 may include a plurality of inputs 21 and/or a plurality of outputs 23 that may be received from and conveyed to a plurality of different computing devices respectively.

The DAG template 20 may further include respective quality-of-service criteria 26 for the plurality of processing stages 22. In the example of FIG. 3, the processing stages 22A, 22B, 22C, 22D . . . 22N have a respective plurality of quality-of-service criteria 26A, 26B, 26C, 26D . . . 26N. Each quality-of-service criterion 26 may, for example, be a maximum allowed latency or a minimum available processing capacity for the processing device 40 on which a processing stage 22 is performed.

Returning to FIG. 1, for each processing stage 22 of the plurality of processing stages 22, the processor 12 may be further configured to select a respective processing device 40 of the plurality of communicatively linked processing devices 40. The processor 12 may be configured to select the processing devices 40 for the processing stages 22 at a resource manager 34. The resource manager 34 may be included in a DAG runtime environment 30, as discussed in further detail below. At the resource manager 34, the processor 12 may be configured to identify a subset of processing devices 40 included in a larger set of currently available processing devices 40. In addition, at the resource manager 34, the processor 12 may be configured to determine, for each processing stage 22, a type of processing device 40 on which that processing stage 22 is configured to be executed. This determination may be made based on one or more types of functions included in the processing stage 22. For example, the processor 12 may be configured to determine that a processing stage 22 that includes a plurality of matrix operations may be performed at a GPU.

At the resource manager 34, the processor 12 may be configured to receive a respective processing capacity indication 48 from each processing device 40 of the plurality of processing devices 40. The processing capacity indication 48 received from a processing device 40 may include a currently available computational throughput for that processing device 40. The processing capacity indication 48 may additionally or alternatively indicate an estimated latency associated with performing one or more processing stages 22 at the processing device 40. When the processor 12 receives a plurality of processing capacity indications 48, the processor 12 may be further configured to select the respective processing devices 40 for the plurality of processing stages 22 based at least in part on the processing capacity indications 48 of the processing devices 40. The respective processing devices 40 for the plurality of processing stages 22 may be selected based at least in part on a determination made at the resource manager 34 that the processing devices 40 satisfy the quality-of-service criteria 26. This determination may be made at least in part by comparing the quality-of-service criteria 26 to the processing capacity indications 48 of the processing devices 40. For example, the processor 12 may be configured to select a set of processing devices 40 that has the lowest total estimated latency from among a plurality of candidate sets of processing devices 40 capable of forming the data pipeline 24.

In FIG. 2, the host processor 52 of the host server device 50 is shown in additional detail. For the CPU 40A, the GPU 40B, the ASIC 40C, and the FPGA 40D, the host processor 52 may be configured to execute a CPU shell 42A, a GPU shell 42B, an ASIC shell 42C, and an FPGA shell 42D, respectively. The CPU shell 42A, the GPU shell 42B, the ASIC shell 42C, and the FPGA shell 42D may respectively include a CPU router 44A, a GPU router 44B, an ASIC router 44C, and an FPGA router 44D via which packets may be passed between the processing devices 40 to execute the different stages of the data pipeline 24, as discussed in further detail below. In addition, the shells shown in FIG. 2 respectively include a CPU library 46A, a GPU library 46B, an ASIC library 46C, and an FPGA library 46D. Each processing device 40 of the plurality of processing devices 40 may be configured to execute one or more predetermined processing functions specified by the device library of that processing device 40.

In addition, the shells of the processing devices 40 may be configured to receive performance data from their respective processing devices 40 and transmit that performance data to the processor 12 of the computing system 10 as one or more processing capacity indications 48. The CPU shell 42A, the GPU shell 42B, the ASIC shell 42C, and the FPGA shell 42D may be respectively configured to generate a CPU processing capacity indication 48A, a GPU processing capacity indication 48B, an ASIC processing capacity indication 48C, and an FPGA processing capacity indication 48D, each of which may be transmitted to the processor 12.

Returning to FIG. 1, at the resource manager 34, the processor 12 may be further configured to determine a routing sequence 60 between the plurality of processing devices 40 according to the DAG template 20. The routing sequence 60 may be a DAG in which the nodes are the processing devices 40 on which the data pipeline 24 is configured to be instantiated. In some examples, as shown in FIG. 1, the DAG runtime environment 30 may further include a routing table 35 indicating a plurality of communicative links between the plurality of processing device shells 42A, 42B, 42C, and 42D. When a routing table 35 is included in the DAG runtime environment 30, the processor 12 may be further configured to, at resource manager 34, determine the routing sequence 60 based at least in part on the communicative links indicated in the routing table 35.

The processor 12 may be further configured to transmit one or more input packets 64 encoding the plurality of processing stages 22 to the respective processing devices 40 selected for the processing stages 22 as specified by the routing sequence 60. The one or more input packets 64 may each include an input packet header 66 and an input packet payload 68. The input packet header 66 may encode routing information for the input packet 64, and the input packet payload may specify one or more functions to evaluate at the plurality of processing devices 40. In some examples, the processor 12 may encode the entire routing sequence 60 in the input packet header 66 of an input packet 64. Alternatively, when the routing sequence 60 includes a plurality of branches, as in the example of FIG. 3, the processor 12 may be configured to transmit input packets 64 a plurality of different input packet headers 66 respectively encoding the branches of the routing sequence 60.

In response to transmitting the one or more input packets 64, the processor 12 may be further configured to receive, from a processing device 40 of the plurality of processing devices 40, one or more output packets 70 encoding a processing result of the data pipeline 24. Each of the output packets 70 may include an output packet header 72 and an output packet payload 74.

Figure 4:
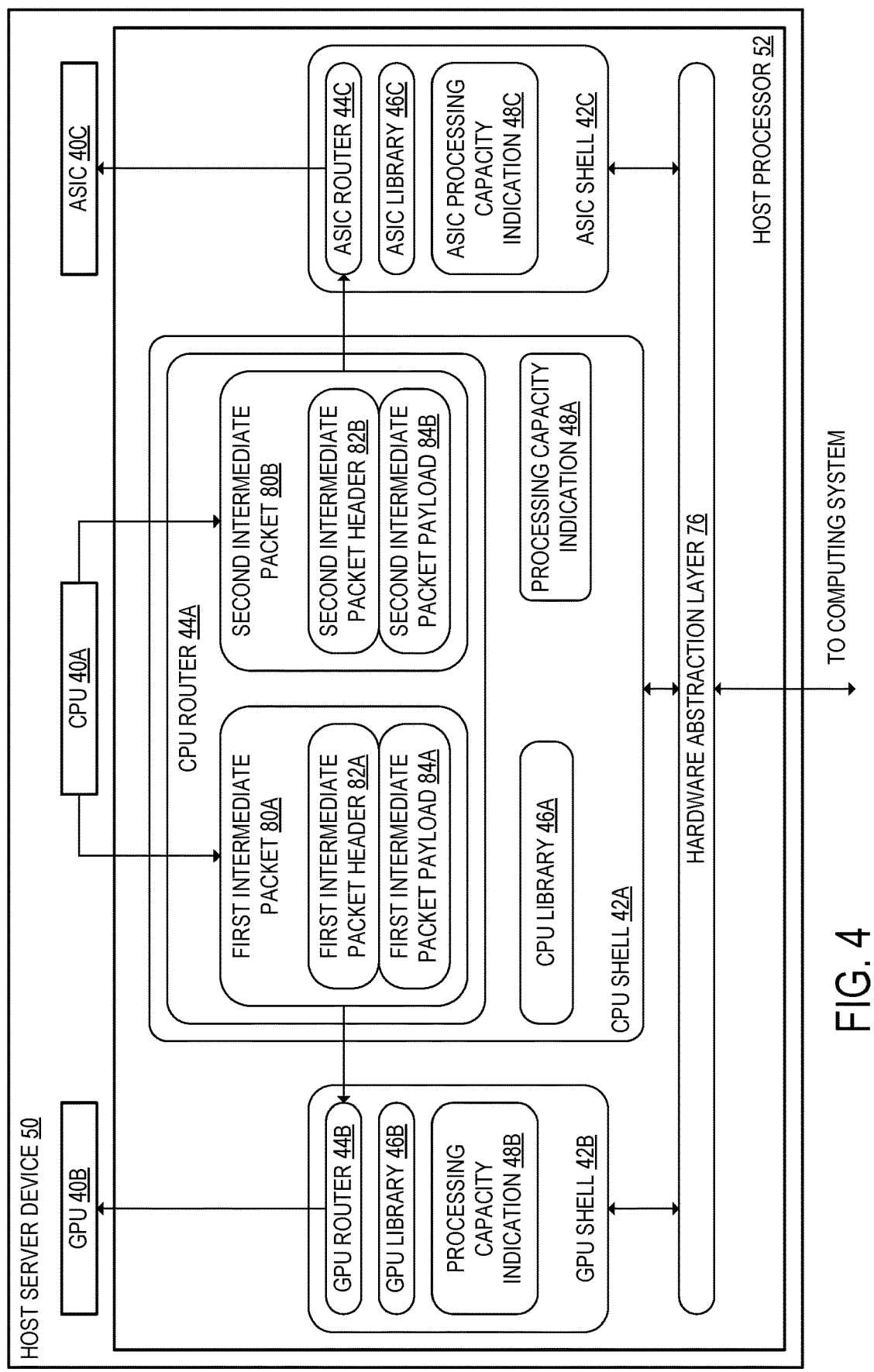
FIG. 4 shows the host processor of the host server device when packets are transmitted between shells of the processing devices, according to the embodiment of FIG. 1.

FIG. 4 shows the CPU shell 42A of the host server device 50 in further detail. Although FIG. 4 focuses on the CPU shell 42A, the other processing device shells shown in FIG. 2 may also include components corresponding to those shown for the CPU shell 42A in FIG. 4. The example of FIG. 4 shows a branch in the routing sequence 60 at which the CPU shell 42A sends packets to both the GPU shell 42B and the ASIC shell 42C. At the CPU router 44A included in the CPU shell 42A, the host processor 52 may be configured to receive a first intermediate packet 80A from a first processing device of the plurality of processing devices 40. The host processor 52 may be configured to convey the first intermediate packet 80A to a second processing device of the plurality of processing devices 40. In this example, the first processing device is the CPU 40A and the second processing device is the GPU 40B. The CPU router 44A may convey the first intermediate packet 80A to the GPU 40B via the GPU router 44B. In addition, the host processor 52 may be further configured to receive a second intermediate packet 80B from the CPU 40A and convey the second intermediate packet 80B to the ASIC 40C via the ASIC router 44C.

The first intermediate packet 80A may include a first intermediate packet header 82A and a first intermediate packet payload 84A, and the second intermediate packet 80B may include a second intermediate packet header 82B and a second intermediate packet payload 84B. For each of the intermediate packets 80A and 80B, the second processing devices to which those intermediate packets are configured to be transmitted may be specified by the respective e intermediate packet headers 82A and 82B of those intermediate packets 80A and 80B.

In the example of FIG. 4, the host processor 52 is configured to execute a hardware abstraction layer 76 via which the one or more input packets 64 are transmitted to the plurality of processing devices 40. In addition, the one or more output packets 70 may be transmitted to the DAG runtime environment 30 via the hardware abstraction layer 76. At the hardware abstraction layer 76, the respective plurality of device libraries of the plurality of processing devices 40 may be multiplexed such that a consistent interface of device libraries is presented to the DAG runtime environment 30. For example, when the CPU library 46A, the GPU library 46B, the ASIC library 46C, and the FPGA library 46D include functions written by a plurality of different third-party developers, the hardware abstraction layer 76 may be configured to homogenize the respective input and output data formats of those functions. Thus, when the user creates the DAG template 20, the user may avoid having to specify changes in the input and output formats of the processing stages when functions from multiple different developers are included in the data pipeline 24.

Figure 5:
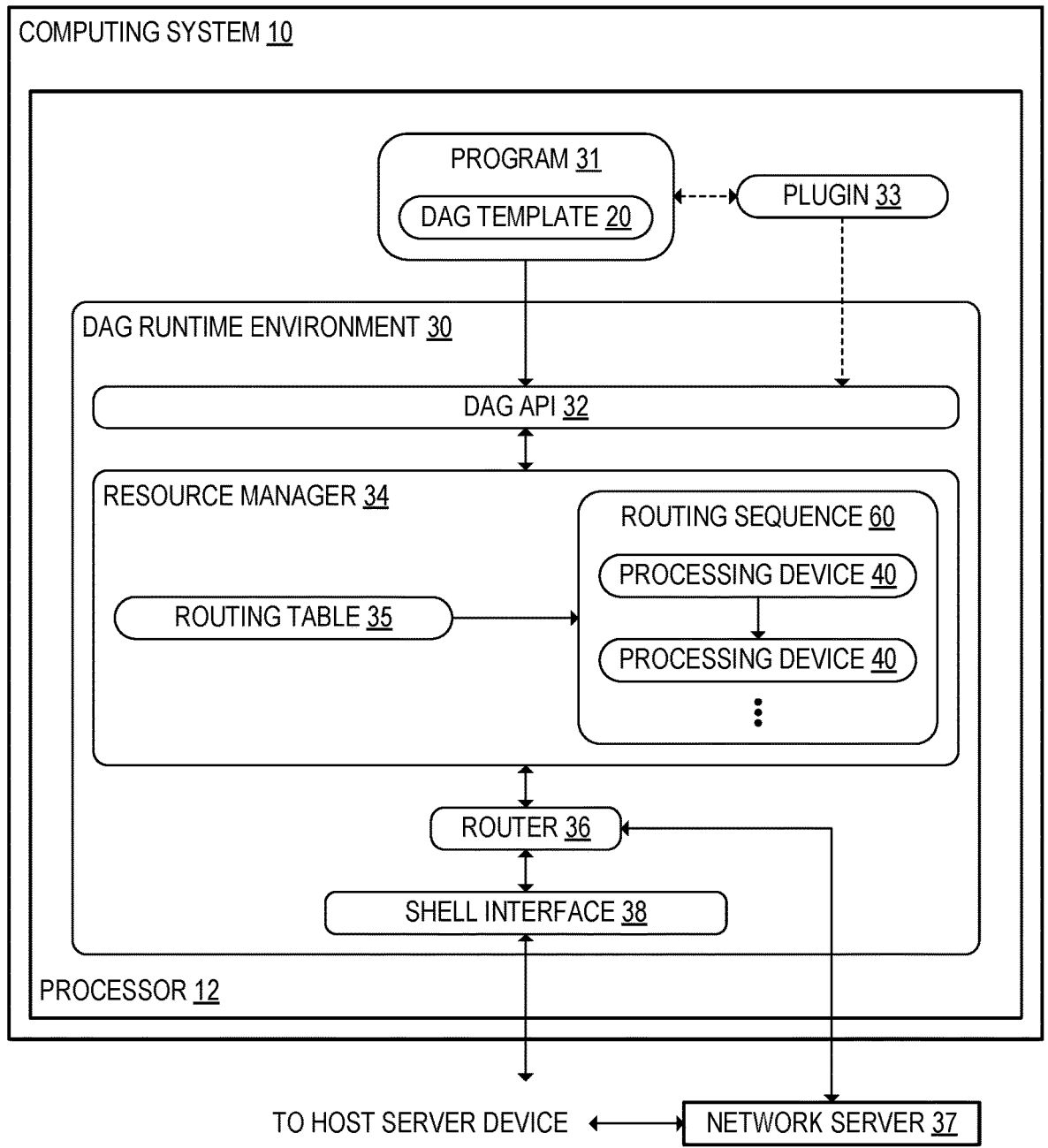
FIG. 5 shows an example DAG runtime environment executed on the processor of the computing system, according to the embodiment of FIG. 1.

FIG. 5 depicts the DAG runtime environment 30 in additional detail. As shown in FIG. 5, the DAG runtime environment 30 may include a DAG application program interface (API) 32 via which the DAG template 20 may be received from a program 31 executed on the processor 12 of the computing system 10. The program 31 may, for example, be a software development kit (SDK) at which a user may construct the DAG template 20. The processor 12 may be further configured to execute one or more plugins 33, which may, for example, include one or more library plugins or one or more workflow plugins. A workflow plugin is a plugin that provides a simplified version of the DAG API 32 to the user. The simplified version of the DAG API 32 may be configured for use with a specific type of computing task, such as training machine learning models. A library plugin is a plugin via which a user may register a custom function with the DAG API 32. A function registered using a library plugin may then be included in a data pipeline 24 built via the DAG API 32.

The DAG runtime environment 30 may further include the resource manager 34, as discussed above. In addition, the DAG runtime environment 30 may further include a router 36 via which the processor 12 is configured to route the one or more input packets 64 and the one or more output packets 70 between the resource manager 34 and the plurality of processing device shells executed at the host server device 50.

The DAG runtime environment 30 may further include a shell interface 38, which may be an API via which the router 36 is configured to communicate with the plurality of processing device shells. When the host processor 52 is configured to execute a hardware abstraction layer 76, as in the example of FIG. 4, the shell interface 38 may be configured to communicate with the plurality of processing device shells via the hardware abstraction layer 76.

The router 36 may be further configured to route packets to and from one or more network servers 37. The one or more network servers 37 may be included in a local- or wide-area network via which the processor 12 of the computing system 10 may communicate with the host processor 52 of the host server device 50.

Figure 6C:
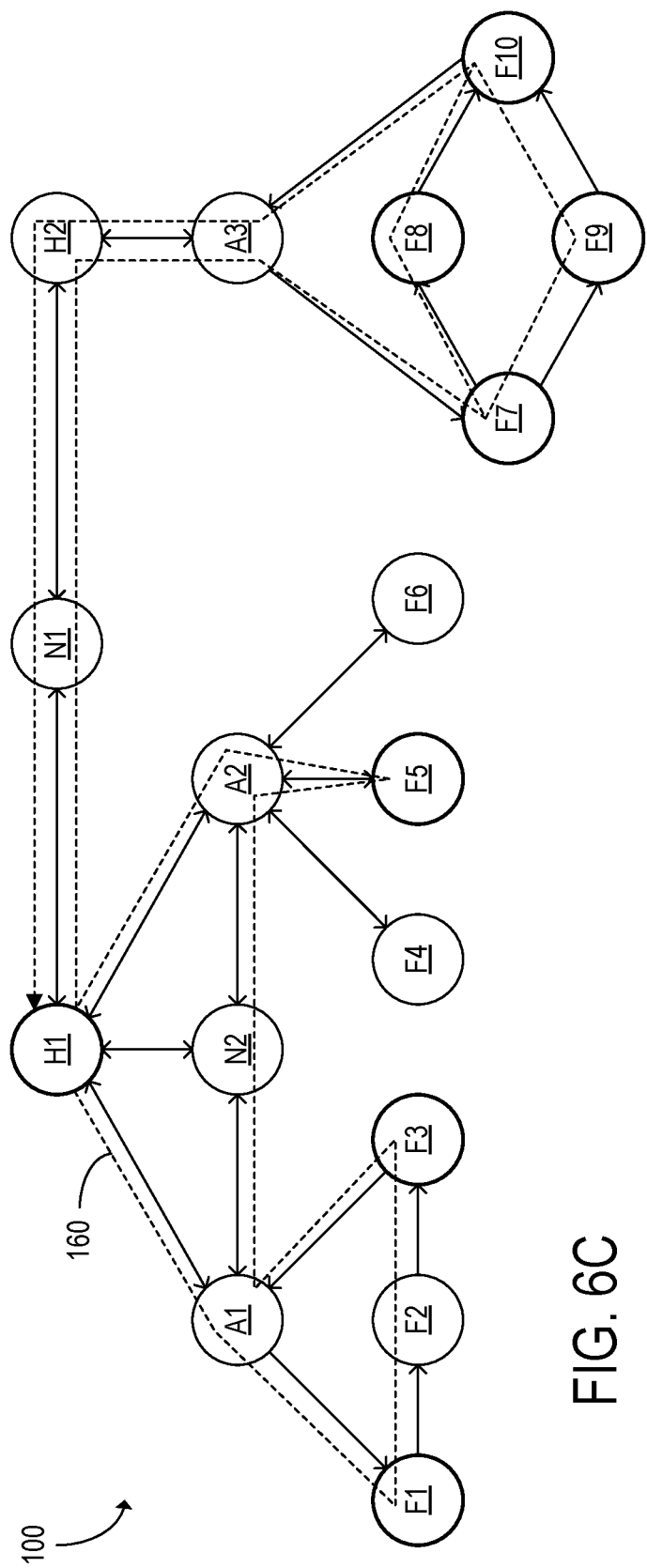
FIG. 6C shows an example instantiation of the data pipeline of FIG. 6B in the network topology of FIG. 6A.

FIGS. 6A-6C show an example in which a routing sequence is determined based on a network topology and a data pipeline. FIG. 6A shows an example network topology 100. The network topology 100 depicted in FIG. 6A is a directed graph including a first host device H1; a second host device H2; a first network N1; a second network N2; three accelerator devices A1, A2, and A3; and ten functions F1, F2, F3, F4, F5, F6, F7, F8, F9, and F10 that may be implemented on the accelerator devices. FIG. 6B shows an example data pipeline 110 that starts and ends at the first host device H1 and includes functions F3, F5, F7, F8, F9, and F10. FIG. 6C shows an example instantiation of the data pipeline 110 of FIG. 6B on the network topology 100 of FIG. 6A. In FIG. 6C, an example routing sequence 160 through the functions included in the data pipeline 110 starts and ends at the first host device H1. As in the example data pipeline 110, the example routing sequence 160 includes two branches coming from the function F7 that respectively pass through the functions F8 and F9 before rejoining at the function F10. Thus, the topology of the routing sequence 160 matches the topology of the data pipeline 110.

Figure 7:
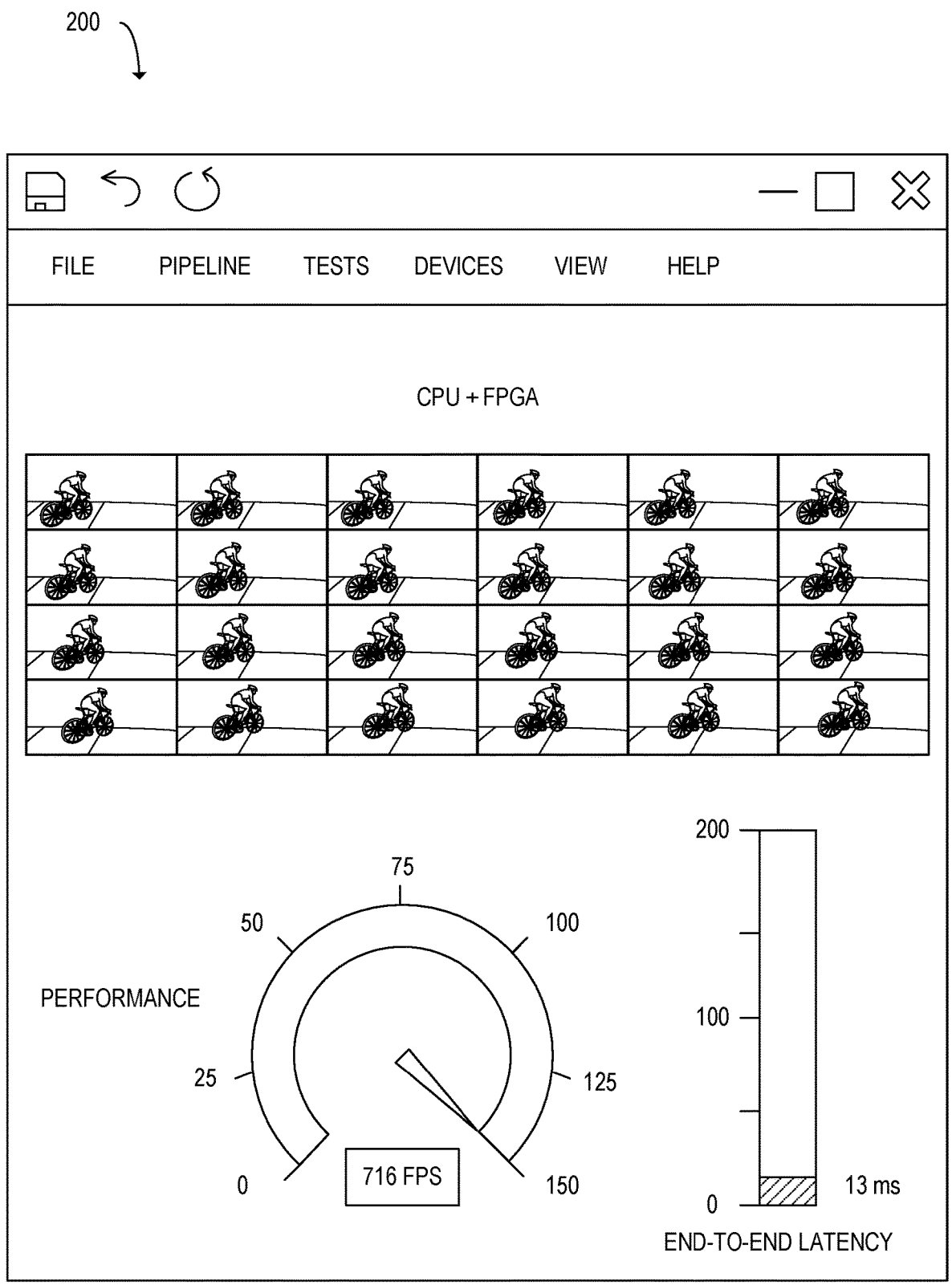
FIG. 7 shows an example graphical user interface for a program, according to the embodiment of FIG. 1.

FIG. 7 shows an example graphical user interface (GUI) 200, which may be a GUI for the program 31 of FIG. 5. In the example of FIG. 7, frames of a video are analyzed at a data pipeline 24 include a CPU 40A and an FPGA 40D. The GUI 200 shows the frames of the video upon which computations are performed. In addition, the GUI 200 shows a plurality of performance metrics for the computations performed at the data pipeline 24. The plurality of performance metrics shown in the example GUI 200 include a number of frames processed per second by the data pipeline 24. In addition, the plurality of performance metrics further include an end-to-end latency of the data pipeline 24.

The user may define the pipeline DAG 20 at the GUI 200. For example, the user may enter code instructions as text to specify the pipeline DAG 20. In one example, the code instructions specifying the pipeline DAG 20 may be included in a JavaScript Object Notation (JSON) file. Additionally or alternatively, the user may construct the pipeline DAG 20 via a drag-and-drop interface.

Figure 8A:
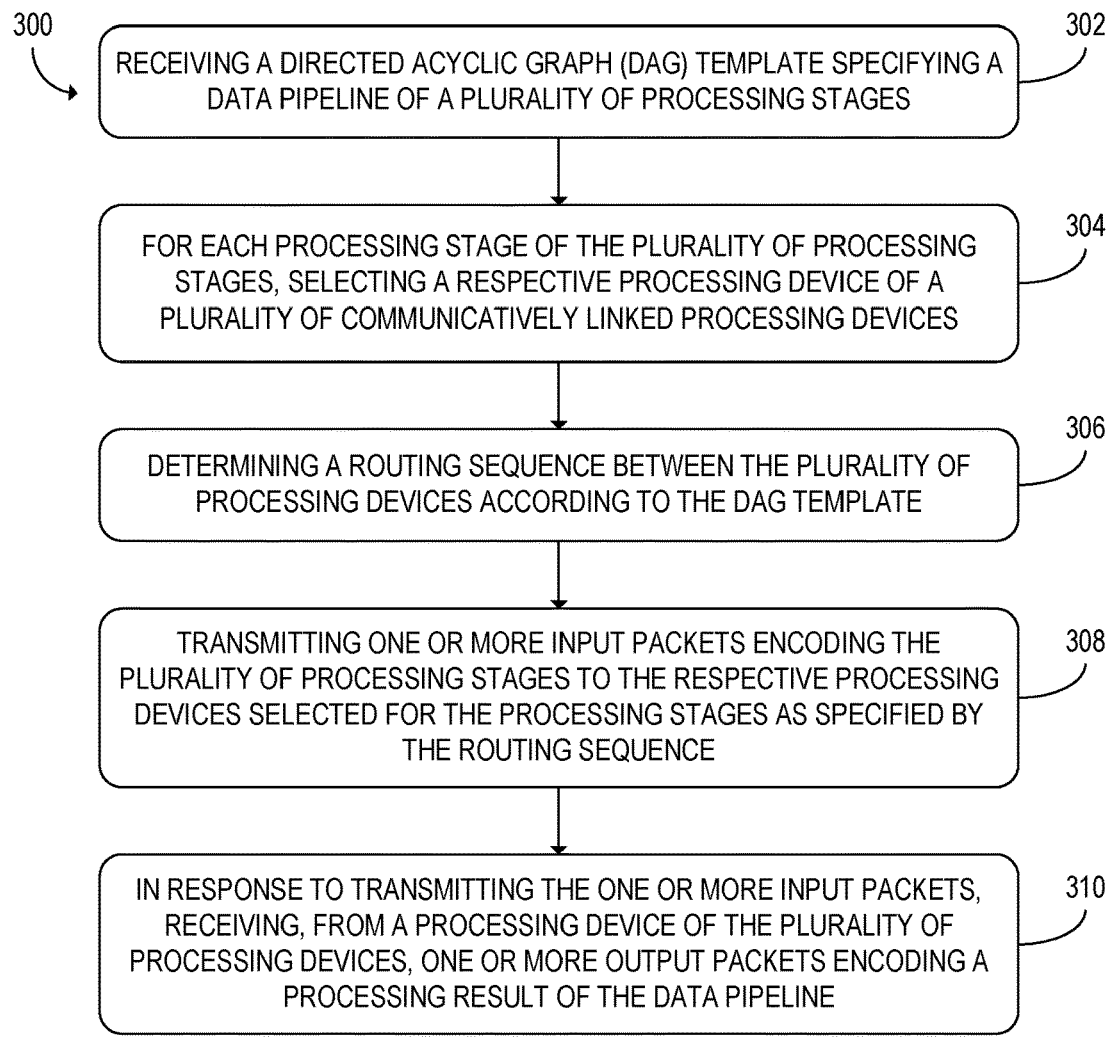
FIG. 8A shows a flowchart of an example method that may be used with a computing system, according to the embodiment of FIG. 1.

Turning now to FIG. 8A, a flowchart of an example method 300 for use with a computing system is shown. The method 300 may be used with the computing system 10 of FIG. 1, or alternatively with some other computing system. The steps of the method 300 may be executed at one or more processors included in the computing system or at one or more other computing devices communicatively linked to the computing system. At step 302, the method 300 may include receiving a DAG template specifying a data pipeline of a plurality of processing stages. Each processing stage may include one or more code instructions. In addition, the DAG template may specify one or more input sources and one or more output recipients of the data pipeline. The DAG template may be received from a program via a DAG API included in a DAG runtime environment. The program from which the DAG template is received may be an SDK at which a user may construct the DAG template.

At step 304, the method 300 may further include, for each processing stage of the plurality of processing stages, selecting a respective processing device of a plurality of communicatively linked processing devices. For example, each processing device may be a CPU, a GPU, an ASIC, an FPGA, or some other type of processing device. The plurality of processing devices may be located at a plurality of different physical computing devices, which may be connected by one or more local- and/or wide-area networks. The respective processing devices for the processing stages may be selected at a resource manager included in the runtime environment. The processing devices may, for example, be selected based on the functions included in the processing stages.

At step 306, the method 300 may further include determining a routing sequence between the plurality of processing devices according to the DAG template. The routing sequence may be determined, for example, by mapping the DAG template onto a network topology that includes the plurality of processing devices. The routing sequence may pass through selected processing devices with an ordering and a topology that match the ordering and topology of the functions specified in the DAG template.

At step 308, the method 300 may further include transmitting one or more input packets encoding the plurality of processing stages to the respective processing devices selected for the processing stages as specified by the routing sequence. Each input packet may include an input packet header and an input packet payload. The input packet header of an input packet may specify at least a portion of the routing sequence. At step 310, the method 300 may further include receiving, from a processing device of the plurality of processing devices, one or more output packets encoding a processing result of the data pipeline. The one or more output packets may be received at the computing system in response to transmitting the one or more input packets.

Figure 8B:
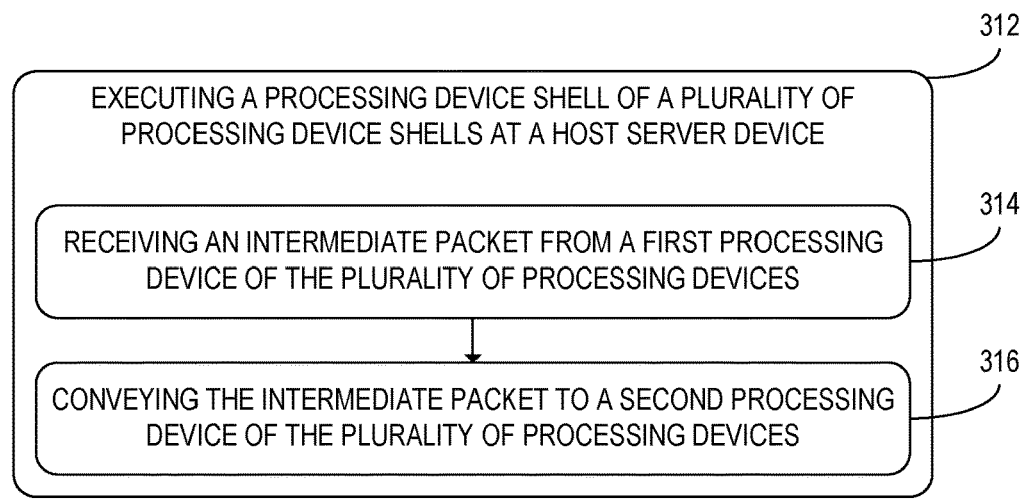
FIGS. 8B-8E show additional steps of the method of FIG. 8A that may be performed in some examples.

FIGS. 8B-8E show additional steps of the method 300 that may be performed in some embodiments. As shown in FIG. 8B, the method 300 may further include, at step 312, executing a processing device shell of a plurality of processing device shells at a host server device. The processing device shell may be configured to handle inputs to, and outputs from, a processing device of the plurality of processing devices. Step 312 may further include, at step 314, receiving an intermediate packet from a first processing device of the plurality of processing devices. The intermediate packet may be a packet generated in response to receiving at least one of the one or more input packets at the first processing device. The intermediate packet may include an intermediate packet header and an intermediate packet payload. At step 316, step 312 may further include conveying the intermediate packet to a second processing device of the plurality of processing devices. The second processing device may be specified by the intermediate packet header of the intermediate packet.

Figure 8C:
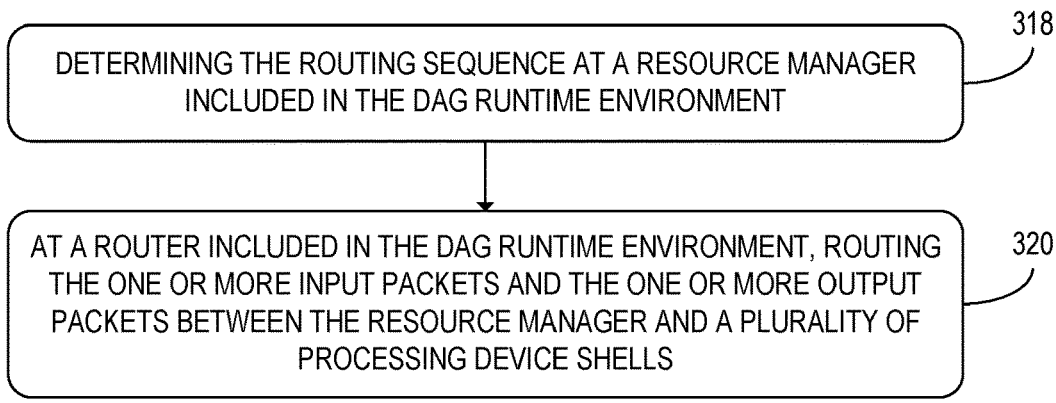

FIG. 8C shows additional steps that may be performed when performing the method 300. Determining the routing sequence at step 306 shown in FIG. 8A may include, at step 318, determining the routing sequence at a resource manager included in the DAG runtime environment. For example, the DAG runtime environment may further include a routing table indicating a plurality of communicative links between the plurality of processing device shells. When the DAG runtime environment includes a routing table, the routing sequence may be determined based at least in part on the communicative links indicated in the routing table.

The method 300 may further include, at step 320, routing the one or more input packets and the one or more output packets between the resource manager and the plurality of processing device shells. The one or more input packets and the one or more output packets may be routed between the resource manager and the plurality of processing device shells at a router included in the DAG runtime environment. The router may be communicatively coupled to one or more network servers. In addition, the router may be configured to route packets between the DAG runtime environment and the one or more processing device shells via a shell interface, which may be an API.

Figure 8D:
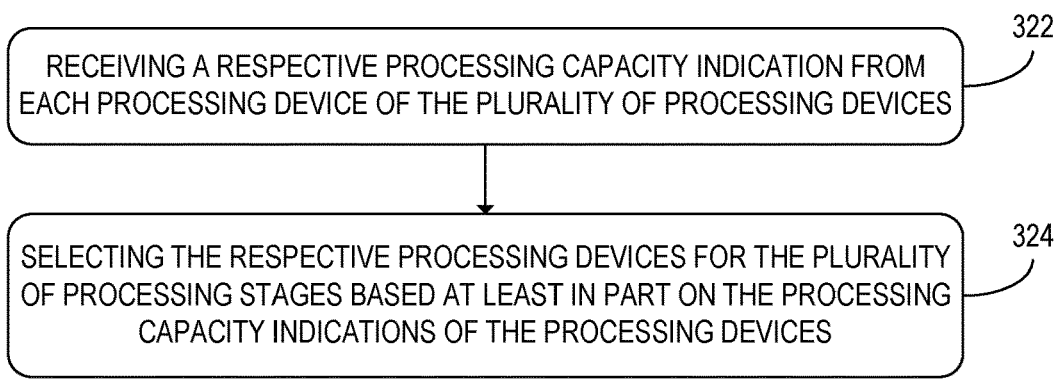

As shown in FIG. 8D, the method 300 may further include, at step 322, receiving a respective processing capacity indication from each processing device of the plurality of processing devices. The processing capacity indication may, for example, be an estimated latency associated with evaluating a function at the processing device. As another example, the processing capacity indication may indicate an amount of traffic at the processing device. At step 324, the method 300 may further include selecting the respective processing devices for the plurality of processing stages based at least in part on the processing capacity indications of the processing devices. For example, step 324 may include, for each processing stage, selecting a processing device that has a lowest latency or a lowest traffic level from among a plurality of processing devices capable of executing a function encoded by the processing stage.

In embodiments in which step 322 and step 324 are executed, the DAG template may further include respective quality-of-service criteria for the plurality of processing stages. When the DAG template includes quality-of-service criteria, the respective processing devices for the plurality of processing stages may be selected based at least in part on a determination that the processing devices satisfy the quality-of-service criteria as indicated by the processing capacity indications of the processing devices. For example, selecting the processing devices for the processing stages at step 324 may include selecting processing devices that have respective latencies below a latency threshold.

Figure 8E:
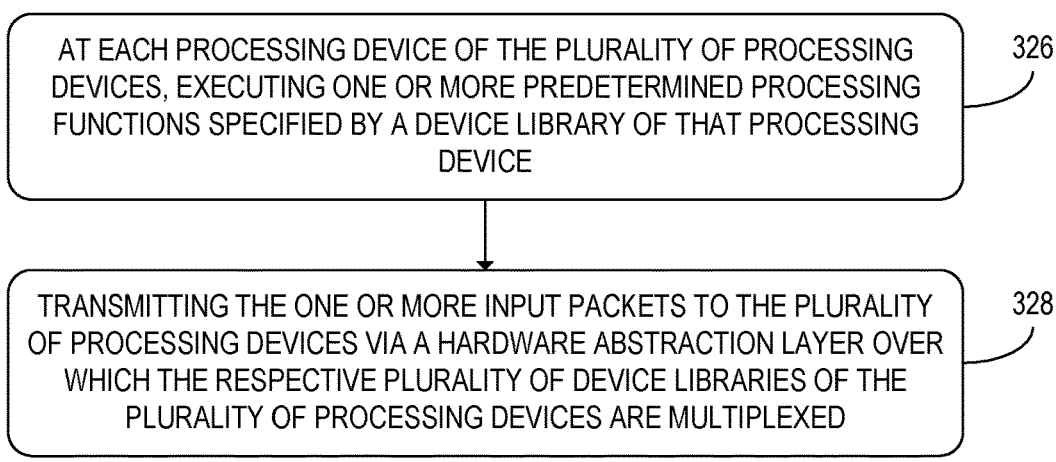

FIG. 8E shows additional steps of the method 300 that may be performed when the plurality of processing stages are executed. At step 326, the method 300 may further include, at each processing device of the plurality of processing devices, executing one or more predetermined processing functions specified by a device library of that processing device. The device library may be included in the processing device shell for the processing device. At step 328, the method 300 may further include transmitting the plurality of input packets to the plurality of processing devices via a hardware abstraction layer. The respective plurality of device libraries of the plurality of processing devices may be multiplexed over the hardware abstraction layer such that the input and output formats of the functions included in the device libraries are homogenized. Thus, the user may construct the DAG template without having to account for differences in expected syntax between function libraries created by different developers.

Using the systems and methods discussed above, a user may write code to instantiate a data pipeline through a plurality of processing devices without having to customize the code for the specific processing devices on which the code is executed. Thus, the code may be simpler and less time-consuming for the user to write. For example, when the data pipeline utilizes processing devices made by different manufacturers, the user may avoid having to include additional code to make the inputs and outputs of those processing devices compatible with each other. The systems and methods discussed above may thereby facilitate the use of specialized hardware accelerators to perform computational tasks more quickly and efficiently.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
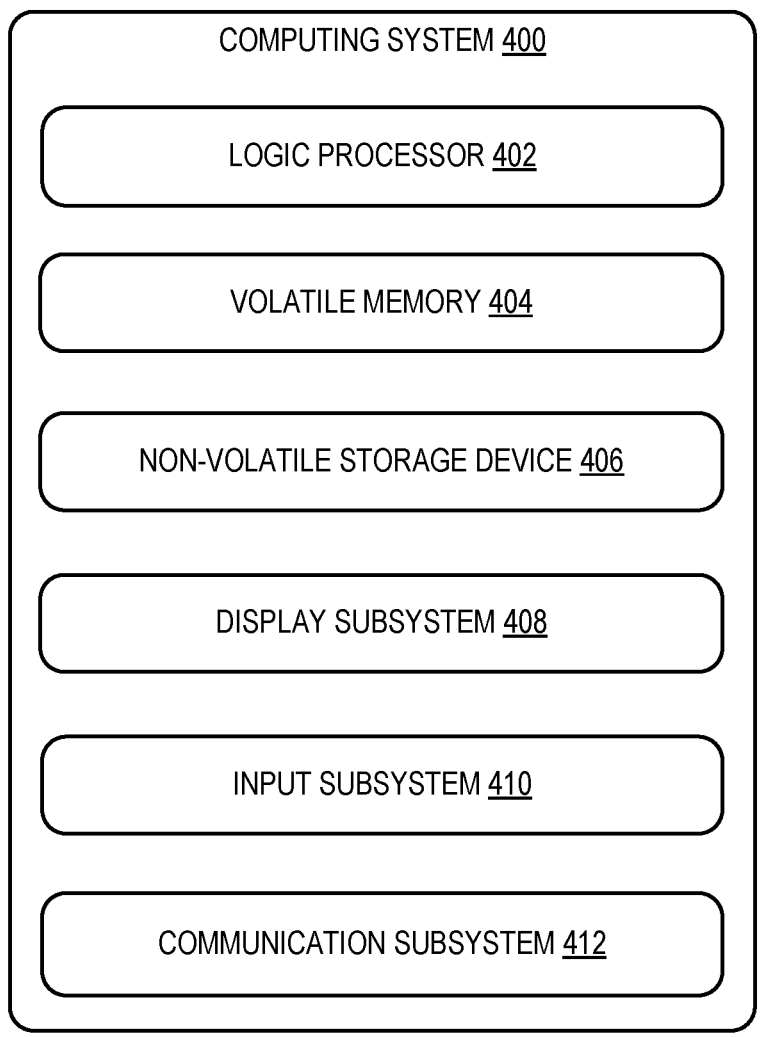
FIG. 9 shows a schematic view of an example computing environment in which the computing system of FIG. 1 may be enacted.

FIG. 9 schematically shows a non-limiting embodiment of a computing system 400 that can enact one or more of the methods and processes described above. Computing system 400 is shown in simplified form. Computing system 400 may embody the computing system 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

The following paragraphs describe several aspects of the present disclosure. According to one aspect of the present disclosure, a computing system is provided, including a processor configured to receive a directed acyclic graph (DAG) template specifying a data pipeline of a plurality of processing stages. For each processing stage of the plurality of processing stages, the processor may be further configured to select a respective processing device of a plurality of communicatively linked processing devices. The processor may be further configured to determine a routing sequence between the plurality of processing devices according to the DAG template. The processor may be further configured to transmit one or more input packets encoding the plurality of processing stages to the respective processing devices selected for the processing stages as specified by the routing sequence. In response to transmitting the one or more input packets, the processor may be further configured to receive, from a processing device of the plurality of processing devices, one or more output packets encoding a processing result of the data pipeline.

According to this aspect, the DAG template may be received from a program via a DAG application program interface (API) included in a DAG runtime environment.

According to this aspect, the processor may be communicatively linked to a host processor of a host server device. The host processor may be configured to, at a processing device shell of a plurality of processing device shells, receive an intermediate packet from a first processing device of the plurality of processing devices. The host processor may be further configured to convey the intermediate packet to a second processing device of the plurality of processing devices.

According to this aspect, the second processing device may be specified by an intermediate packet header of the intermediate packet.

According to this aspect, the DAG runtime environment may further include a resource manager at which the processor is configured to determine the routing sequence. The DAG runtime environment may further include a router via which the processor is configured to route the one or more input packets and the one or more output packets between the resource manager and the plurality of processing device shells.

According to this aspect, the DAG runtime environment may further include a routing table indicating a plurality of communicative links between the plurality of processing device shells. The processor may be further configured to, at the resource manager, determine the routing sequence based at least in part on the communicative links indicated in the routing table.

According to this aspect, the processor may be further configured to receive a respective processing capacity indication from each processing device for the plurality of processing devices. The processor may be further configured to select the respective processing devices of the plurality of processing stages based at least in part on the processing capacity indications of the processing devices.

According to this aspect, the DAG template may further include respective quality-of-service criteria for the plurality of processing stages. The processor may be further configured to select the respective processing devices for the plurality of processing stages based at least in part on a determination that the processing devices satisfy the quality-of-service criteria as indicated by the processing capacity indications of the processing devices.

According to this aspect, each processing device of the plurality of processing devices may be configured to execute one or more predetermined processing functions specified by a device library of that processing device.

According to this aspect, the one or more input packets may be transmitted to the plurality of processing devices via a hardware abstraction layer over which the respective plurality of device libraries of the plurality of processing devices are multiplexed.

According to this aspect, each processing device may be a central processing unit (CPU), a graphical processing unit (GPU), an application-specific integrated circuit (ASIC), or a field-programmable gate array (FPGA).

According to another aspect of the present disclosure, a method for use with a computing system is provided. The method may include receiving a directed acyclic graph (DAG) template specifying a data pipeline of a plurality of processing stages. For each processing stage of the plurality of processing stages, the method may further include selecting a respective processing device of a plurality of communicatively linked processing devices. The method may further include determining a routing sequence between the plurality of processing devices according to the DAG template. The method may further include transmitting one or more input packets encoding the plurality of processing stages to the respective processing devices selected for the processing stages as specified by the routing sequence. In response to transmitting the one or more input packets, the method may further include receiving, from a processing device of the plurality of processing devices, one or more output packets encoding a processing result of the data pipeline.

According to this aspect, the DAG template may be received from a program via a DAG application program interface (API) included in a DAG runtime environment.

According to this aspect, the method may further include executing a processing device shell of a plurality of processing device shells at a host server device. Executing the processing device shell may include receiving an intermediate packet from a first processing device of the plurality of processing devices. Executing the processing device shell may further include conveying the intermediate packet to a second processing device of the plurality of processing devices.

According to this aspect, the second processing device may be specified by an intermediate packet header of the intermediate packet.

According to this aspect, the method may further include determining the routing sequence at a resource manager included in the DAG runtime environment. The method may further include, at a router included in the DAG runtime environment, routing the one or more input packets and the one or more output packets between the resource manager and the plurality of processing device shells.

According to this aspect, the method may further include receiving a respective processing capacity indication from each processing device of the plurality of processing devices. The method may further include selecting the respective processing devices for the plurality of processing stages based at least in part on the processing capacity indications of the processing devices.

According to this aspect, the DAG template may further include respective quality-of-service criteria for the plurality of processing stages. The respective processing devices for the plurality of processing stages may be selected based at least in part on a determination that the processing devices satisfy the quality-of-service criteria as indicated by the processing capacity indications of the processing devices.

According to this aspect, at each processing device of the plurality of processing devices, the method may further include executing one or more predetermined processing functions specified by a device library of that processing device. The method may further include transmitting the one or more input packets to the plurality of processing devices via a hardware abstraction layer over which the respective plurality of device libraries of the plurality of processing devices are multiplexed.

According to another aspect of the present disclosure, a computing system is provided, including a plurality of processing devices. Each processing device may be a central processing unit (CPU), a graphical processing unit (GPU), an application-specific integrated circuit (ASIC), or a field-programmable gate array (FPGA). The computing system may further include a processor configured to receive a directed acyclic graph (DAG) template specifying a data pipeline of a plurality of processing stages. For each processing stage of the plurality of processing stages, the processor may be further configured to select a respective processing device of the plurality of processing devices. The processor may be further configured to determine a routing sequence between the plurality of processing devices according to the DAG template. The processor may be further configured to execute the plurality of processing stages at the respective processing devices selected for those processing stages in an order specified by the routing sequence.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
receive a directed acyclic graph (DAG) template specifying a data pipeline of a plurality of processing stages, wherein the DAG template is received from a program via a DAG application program interface (API) included in a DAG runtime environment;
for each processing stage of the plurality of processing stages, select a respective processing device of a plurality of communicatively linked processing devices;
determine a routing sequence between the plurality of processing devices according to the DAG template;
transmit one or more input packets encoding the plurality of processing stages to the respective processing devices selected for the processing stages as specified by the routing sequence; and
in response to transmitting the one or more input packets, receive, from a processing device of the plurality of processing devices, one or more output packets encoding a processing result of the data pipeline, wherein:
the processor is communicatively linked to a host processor of a host server device;
the host processor is configured to, at a processing device shell of a plurality of processing device shells:
receive an intermediate packet from a first processing device of the plurality of processing devices; and
convey the intermediate packet to a second processing device of the plurality of processing devices; and
the second processing device is specified by an intermediate packet header of the intermediate packet.

2. The computing system of claim 1, wherein the DAG runtime environment further includes:
a resource manager at which the processor is configured to determine the routing sequence; and
a router via which the processor is configured to route the one or more input packets and the one or more output packets between the resource manager and the plurality of processing device shells.

3. The computing system of claim 2, wherein:
the DAG runtime environment further includes a routing table indicating a plurality of communicative links between the plurality of processing device shells; and the processor is further configured to, at the resource manager, determine the routing sequence based at least in part on the communicative links indicated in the routing table.

4. The computing system of claim 1, wherein the processor is further configured to:
receive a respective processing capacity indication from each processing device for the plurality of processing devices; and
select the respective processing devices of the plurality of processing stages based at least in part on the processing capacity indications of the processing devices.

5. The computing system of claim 4, wherein:
the DAG template further includes respective quality-of-service criteria for the plurality of processing stages; and
the processor is further configured to select the respective processing devices for the plurality of processing stages based at least in part on a determination that the processing devices satisfy the quality-of-service criteria as indicated by the processing capacity indications of the processing devices.

6. The computing system of claim 1, wherein each processing device of the plurality of processing devices is configured to execute one or more predetermined processing functions specified by a device library of that processing device.

7. The computing system of claim 6, wherein the one or more input packets are transmitted to the plurality of processing devices via a hardware abstraction layer over which the respective plurality of device libraries of the plurality of processing devices are multiplexed.

8. The computing system of claim 1, wherein each processing device is a central processing unit (CPU), a graphical processing unit (GPU), an application-specific integrated circuit (ASIC), or a field-programmable gate array (FPGA).

9. A method for use with a computing system, the method comprising:
receiving a directed acyclic graph (DAG) template specifying a data pipeline of a plurality of processing stages, wherein the DAG template is received from a program via a DAG application program interface (API) included in a DAG runtime environment;
for each processing stage of the plurality of processing stages, selecting a respective processing device of a plurality of communicatively linked processing devices;
determining a routing sequence between the plurality of processing devices according to the DAG template;
transmitting one or more input packets encoding the plurality of processing stages to the respective processing devices selected for the processing stages as specified by the routing sequence;
in response to transmitting the one or more input packets, receiving, from a processing device of the plurality of processing devices, one or more output packets encoding a processing result of the data pipeline; and
executing a processing device shell of a plurality of processing device shells at a host server device, wherein executing the processing device shell includes:
receiving an intermediate packet from a first processing device of the plurality of processing devices; and
conveying the intermediate packet to a second processing device of the plurality of processing devices, wherein the second processing device is specified by an intermediate packet header of the intermediate packet.

10. The method of claim 9, further comprising:
determining the routing sequence at a resource manager included in the DAG runtime environment; and
at a router included in the DAG runtime environment, routing the one or more input packets and the one or more output packets between the resource manager and the plurality of processing device shells.

11. The method of claim 9, further comprising:
receiving a respective processing capacity indication from each processing device of the plurality of processing devices; and
selecting the respective processing devices for the plurality of processing stages based at least in part on the processing capacity indications of the processing devices.

12. The method of claim 11, wherein:
the DAG template further includes respective quality-of-service criteria for the plurality of processing stages; and
the respective processing devices for the plurality of processing stages are selected based at least in part on a determination that the processing devices satisfy the quality-of-service criteria as indicated by the processing capacity indications of the processing devices.

13. The method of claim 9, further comprising:
at each processing device of the plurality of processing devices, executing one or more predetermined processing functions specified by a device library of that processing device; and
transmitting the one or more input packets to the plurality of processing devices via a hardware abstraction layer over which the respective plurality of device libraries of the plurality of processing devices are multiplexed.

14. A computing system comprising:
a plurality of processing devices, wherein each processing device is a central processing unit (CPU), a graphical processing unit (GPU), an application-specific integrated circuit (ASIC), or a field-programmable gate array (FPGA);
a processor configured to:
receive a directed acyclic graph (DAG) template specifying a data pipeline of a plurality of processing stages, wherein the DAG template is received from a program via a DAG application program interface (API) included in a DAG runtime environment;
for each processing stage of the plurality of processing stages, select a respective processing device of the plurality of processing devices;
determine a routing sequence between the plurality of processing devices according to the DAG template; and
execute the plurality of processing stages at the respective processing devices selected for those processing stages in an order specified by the routing sequence, wherein:
executing the plurality of processing stages includes, at a processing device shell of a plurality of processing device shells:
receiving an intermediate packet from a first processing device of the plurality of processing devices; and
conveying the intermediate packet to a second processing device of the plurality of processing devices; and the second processing device is specified by an intermediate packet header of the intermediate packet.

\* \* \* \* \*